March 11, 1924.  1,486,611
J. W. STEWART
BRAKE FOR ROAD VEHICLES
Filed Feb. 20, 1923  2 Sheets-Sheet 1
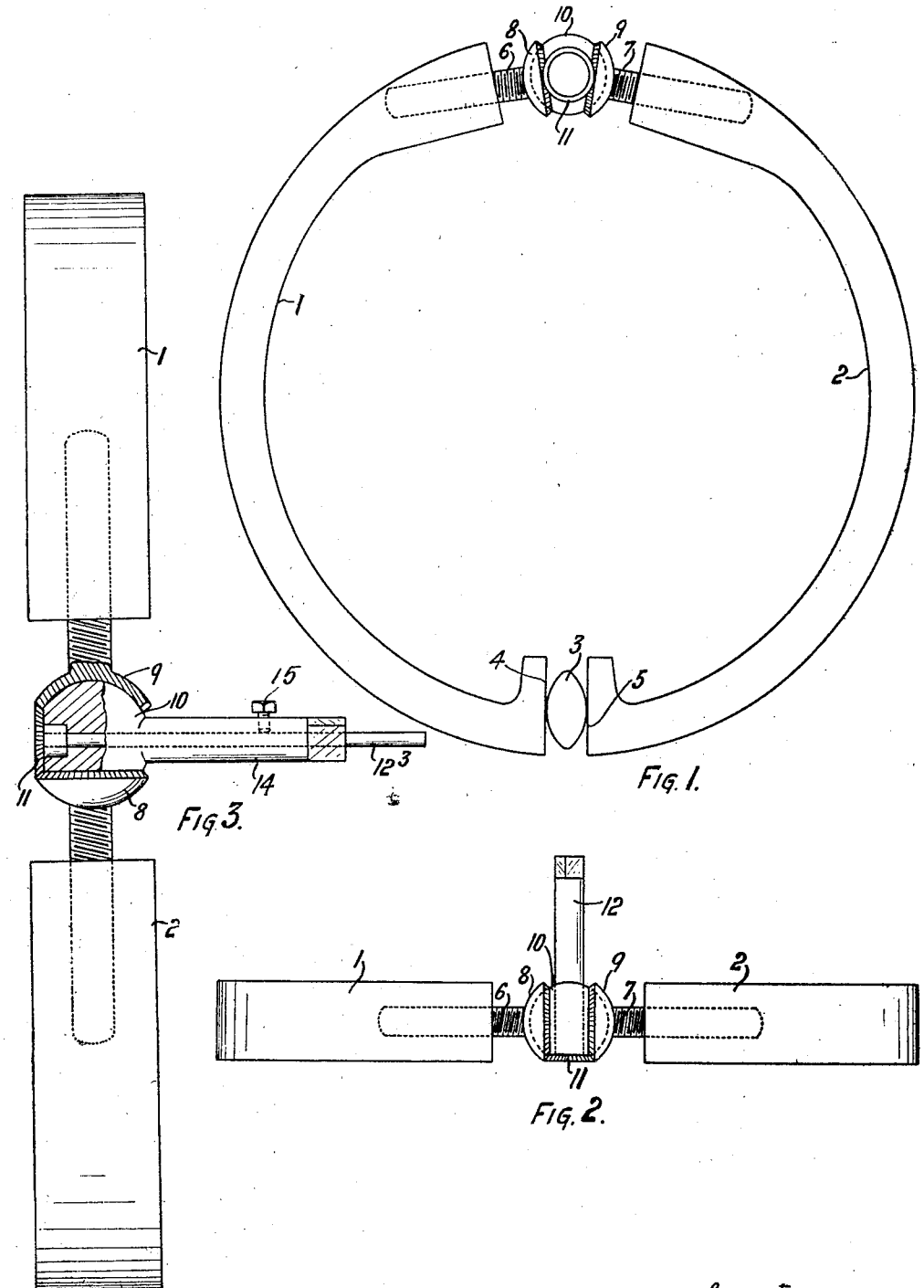

March 11, 1924.

J. W. STEWART 1,486,611

BRAKE FOR ROAD VEHICLES

Filed Feb. 20, 1923    2 Sheets-Sheet 2

Inventor
John Walker Stewart

Patented Mar. 11, 1924.

1,486,611

UNITED STATES PATENT OFFICE.

JOHN WALKER STEWART, OF CRAWFORD, SCOTLAND.

BRAKE FOR ROAD VEHICLES.

Application filed February 20, 1923. Serial No. 620,198.

*To all whom it may concern:*

Be it known that I, JOHN WALKER STEWART, a subject of the King of the United Kingdom of Great Britain and Ireland, and residing at Crawford, Lanarkshire, Scotland, have invented a certain new and useful Improvement in Brakes for Road Vehicles, of which the following is a specification.

This invention relates to vehicle wheel brakes of the type including a pair or pairs of pivotally connected shoes engageable with a drum.

According to the invention, screws are screw-threaded into the pivotally connected ends of the shoes, each of which screws presents a cup-shaped head for accommodation of a ball joint which functions as a distance piece, the cup-shaped heads being formed as toothed crowns engaging a bevel gear on the end of an adjusting rod passing through the ball joint and operable from the exterior of the brake housing, the arrangement being such that rotation of the rod effects rotation of the screws in opposite directions, whereby the shoes are either expanded or contracted.

Figure 4:
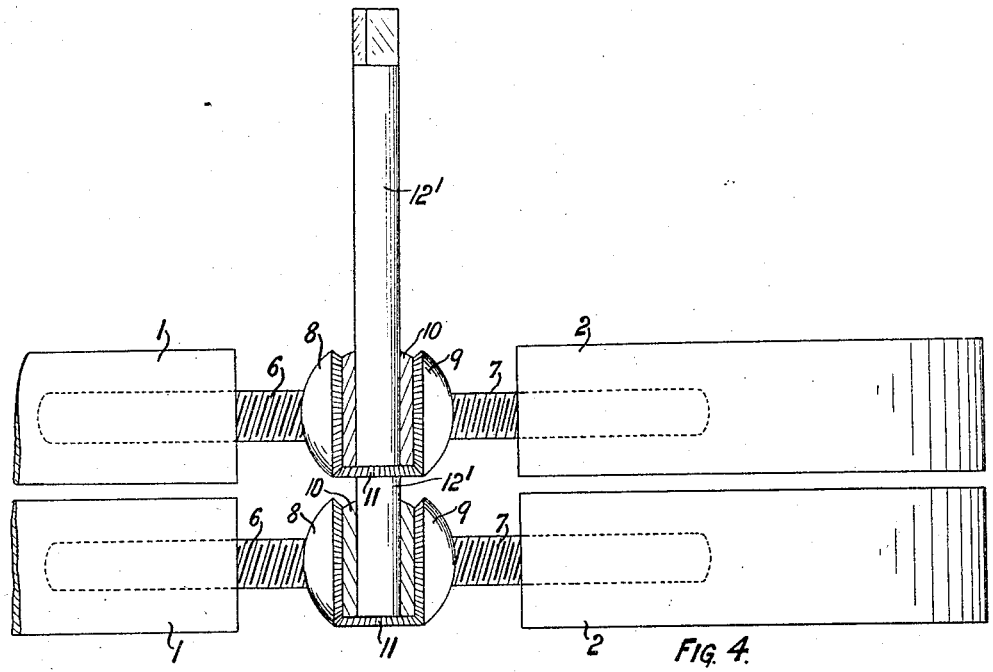
Figure 5:
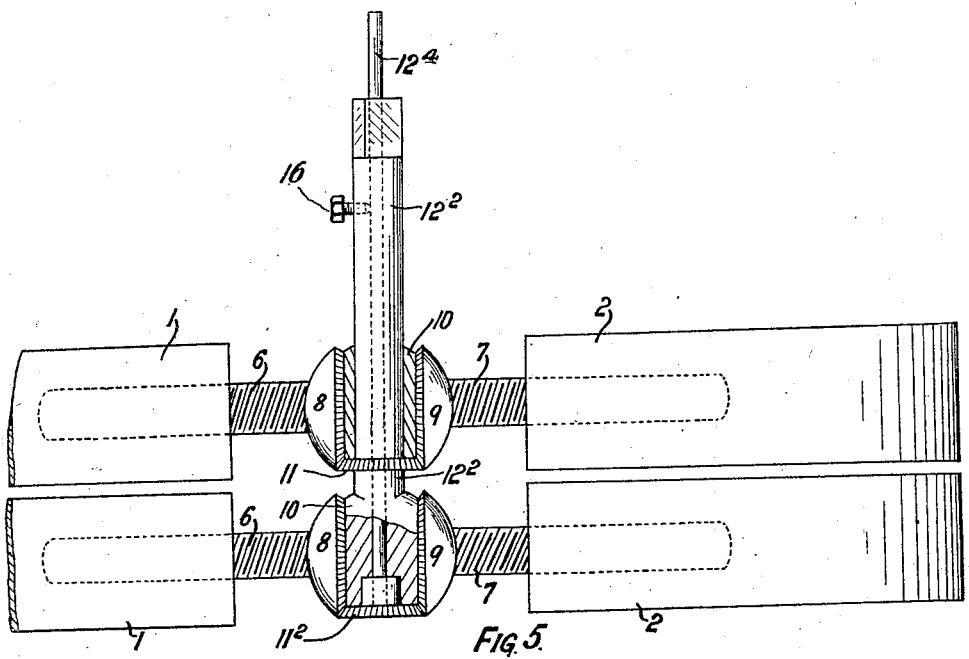

The invention is illustrated in the accompanying diagrammatic drawing in which Fig. 1 is an elevation and Fig. 2 a plan of a preferred construction. Fig. 3 shows a modification applicable to brakes for Ford cars. Figs. 4 and 5 show arrangements suitable for twin brakes.

Referring first to Figs. 1 and 2, the brake shown includes a pair of shoes 1, 2 separable by a cam 3 interposed between cam surfaces 4, 5.

The connection between the ends of the shoes remote from the cam surfaces is constituted by a pair of screws 6, 7 in screw-threaded relation with the ends of the brake shoes, each of which screws 6, 7 presents a cup-shaped head 8 or 9 for accommodation of a ball joint 10 which functions as a distance piece. The cup-shaped heads 8, 9 are formed as toothed crowns engaging a bevel gear 11 formed on the end of an adjusting rod 12 passing through the ball joint 10. The arrangement is such that rotation of the rod 12 effects rotation of the screws 6, 7 in opposite directions, whereby the shoes 1, 2 are either expanded or contracted.

The modification shown in Fig. 3 is designed for use in a Ford car and is so arranged that the pivotal connection will perform the function of the cam 3 in Fig. 1. The adjusting rod 12 is replaced by a tube 14 formed at one end with a ball joint 10 and at the other end with means for attachment to the brake-operating crank, there being fitted within the tube an adjusting rod $12^3$ provided with a bevel 11 engaging toothed crowns formed on cup-shaped heads 8, 9. For locking the rod $12^3$ to the tube 14 after adjustment, so that, when the brake-operating crank is actuated, the rod $12^3$ and the tube 14 are caused to rotate and the brake shoes are expanded, there is provided a set pin 15 engaging a screw-threaded aperture in the tube 14 and entering into locking engagement with the rod $12^3$.

Fig. 4 shows an arrangement applied to twin brakes where two sets of pivotal connections are provided, the respective ball joints being mounted on a single rod 12' corresponding to the rod 12.

In the modification shown in Fig. 5 in which for the rod 12 there is substituted a tube $12^2$ connected to one bevel gear 11 there is fitted within the tube a second adjusting rod $12^4$ connected to the other bevel gear $11^2$. The arrangement shown in Fig. 5 provides for adjustment of the twin brakes independently of one another. A set pin 16 engages a screw-threaded aperture in the tube $12^2$ and enters into locking engagement with a rod $12^4$, provision thus being made for locking the adjustment rod in selected positions.

I claim:—

1. In a brake, the combination with a pair of shoes of two screws threaded into ends of the shoes, each screw presenting a cup-shaped head formed as a toothed crown, a ball joint accommodated in the cup-shaped heads, an adjusting rod passing through the ball joint, and a bevel gear on the adjusting rod engageable with each toothed crown.

2. In a brake, the combination with a pair of shoes each formed at one end with a cam surface, screws threaded into the other ends of the shoes, said screws presenting cup-shaped heads formed as toothed crowns, a ball joint accommodated in said heads, an adjusting member extending through said ball joint, and a bevel gear on said adjusting member engageable with said toothed crowns.

3. In a brake, in combination, expanding and contracting shoes having pivotally connected ends, a pair of screws in screw-threaded relation with said connected ends, said screws presenting cup-shaped heads having toothed crowns, a ball joint interposed between said cup-shaped heads, and an adjusting rod passing through said ball joint and provided with a toothed bevel gear meshing with said toothed crowns, said adjusting rod being rotatable so as to rotate said screws.

4. In a brake, in combination, a plurality of braking units each comprising two shoes having pivotally connected ends, a pair of screws in screw-threaded relation with said connected ends said screws presenting cup-shaped heads having toothed crowns, and a ball joint interposed between said cup-shaped heads and adjusting means passing through the ball joints of the units, said adjusting means including toothed bevels meshing with said crowns.

5. In a brake, in combination, a plurality of braking units each comprising two shoes having pivotally connected ends, a pair of screws in screw-threaded relation with said connected ends, said screws presenting cup-shaped heads having toothed crowns, and a ball joint interposed between said cup-shaped heads, and adjusting means passing through the ball joints of the units, said adjusting means including independently rotatable toothed bevels meshing with said crowns.

In testimony whereof I have signed my name to this specification in the presence of two subscribing witnesses.

JOHN WALKER STEWART.

Witnesses:
WALLACE CRAMTON FAIRWEATHER,
HELEN NICHOLSON CRAIG,